United States Patent
Carlson et al.

[11] Patent Number: 5,815,895
[45] Date of Patent: Oct. 6, 1998

[54] REMOTE CONTROL LATCH SYSTEM

[76] Inventors: Bradley O. Carlson, 2258 N. 10th St., Apt. 16, Laramie, Wyo. 82070; Brian L. Griffis, 243 W. 80th Ave., Bldg. 1, Apt. 203, Denver, Colo. 80221

[21] Appl. No.: 763,098

[22] Filed: Dec. 7, 1996

[51] Int. Cl.$^6$ ..................................................... A44B 11/25
[52] U.S. Cl. .................................. 24/603; 24/637; 24/641
[58] Field of Search ............................ 24/603, 602, 633, 24/641, 637

[56] References Cited

U.S. PATENT DOCUMENTS

| | | | |
|---|---|---|---|
| 3,504,406 | 4/1970 | Schott | 24/603 |
| 4,050,122 | 9/1977 | Turner et al. | 24/603 |
| 4,149,746 | 4/1979 | Androski. | |
| 4,432,119 | 2/1984 | Schwark et al. | 24/603 |
| 4,555,831 | 12/1985 | Otzen et al. | 24/603 |
| 4,902,156 | 2/1990 | Deisler et al. | 24/603 X |
| 5,435,046 | 7/1995 | Miyauchi et al. | 24/603 |
| 5,566,431 | 10/1996 | Haglund | 24/633 |

FOREIGN PATENT DOCUMENTS

| | | | |
|---|---|---|---|
| 234681 | 8/1961 | Australia | 24/603 |
| 1316994 | 12/1962 | France | 24/637 |
| 2326209 | 4/1977 | France | 24/641 |

Primary Examiner—Peter M. Cuomo
Assistant Examiner—Hanh V. Tran
Attorney, Agent, or Firm—Ramon L. Pizarro; Edwin H. Crabtree

[57] ABSTRACT

A latch system for joining a first strap section or section of flexible support to a second strap section or section of flexible support. Attached to the second strap section is a rod that is adapted for insertion into the latch system, and for releasing the second strap section in response to a control signal. The latch system also includes a support housing with a cross member and an attachment for attaching the housing to the first strap. The system also includes a crank shaft with a longitudinal axis and which is rotatably supported within the support housing. The crank shaft also includes a generally slotted opening that is substantially parallel to its longitudinal axis. Within the housing is also mounted a mechanism for allowing rotation of the crank shaft in response to a control signal, the rotation being between a first position where the generally slotted opening of the crank shaft is obstructed by the cross member of the support housing, so that the rod may retained within the longitudinal opening of the crank shaft, and a second position where the longitudinal opening on the crank shaft is generally unobstructed by the cross member of the support housing, so that the rod may be removed from the slotted opening of the crank shaft.

13 Claims, 4 Drawing Sheets

REMOTE CONTROL LATCH SYSTEM

BACKGROUND OF THE INVENTION (a) Field of the Invention

This invention generally relates to field of releaseable latches, and more particularly, but not by way of limitation, to a high load capacity, remote controlled, latch system for a cinch or the like.

(b) Discussion of Prior Art

In the sport of rodeo bull riding or bronco riding, a rider is required to mount an animal, which does not want to be mounted, and stay on the animal for 8 seconds. After the rider completes the 8 second ride, points are awarded for the degree of difficulty of the animal and for the rider's skill.

To try to stay on the animal, the animal is fitted with a cinch strap which includes a device called the "rigging". The rigging includes a handle which is typically custom fitted for the particular rider's hand. It is important to have custom fitted rigging since this helps ensure that his hand does not accidentally slip out of the rigging while riding the animal. Also, in order to prepare himself for the ride, the rider typically mounts the animal while the animal is being restrained in a chute. The rider then places a special glove on his hand. The glove includes sections of leather that are used to take up any gaps and firmly wedge the rider's hand in the rigging. To further enhance the grip, the rider applies generous amounts of rosin to the glove and then ties the glove to his wrist by means of a leather cord. The final result being that the rider's hand is securely connected to the rigging.

Thus it becomes apparent that one of the most serious problems with the rigging is that the devices are designed to keep the rider attached to the animal, and do not provide adequate means for releasing the rider in the event of an emergency. For example if the rider is thrown from the back of the animal and to the side of the animal, the rider will not be able to free himself from the rigging handle. The result being that the cowboy is left hanging from the animal by his riding hand, and being jerked wildly and unsympathetically around the arena by the animal, who simply wants to get rid of the rider. To try to save the rider from his predicament, rodeos typically employ "pick-up" men who try to control the animal in order to get it to allow the rider to escape. Clearly, the faster the rider is freed from danger, the better his chances for escaping without serious injury.

There are known devices for releasing the rigging in the event of an emergency. These devices include a simple leather chord that is tied with a quick release knot. To release the rider in an emergency the pick-up men must be able to reach the chord to release the rider. Alternatively, the rider himself must pull the chord in order to release the knot. This approach, however, has serious limitations. The first being that it places the pick-up men in a position of danger, while the rider is already in danger. Also, the rider is unlikely to be able to reach the chord to release himself as he is being tossed around wildly by the animal. Accordingly, these devices are currently not accepted by the Professional Rodeo Cowboy's Association or the College Rodeo Association.

While the problems with rigging safety have long been recognized, an adequate solution has yet to be revealed by the known prior art. This is perhaps due to the fact that any solution must be able to withstand severe shock loads as well as static loads in the range of 1000 pounds. Moreover, since rodeo events are typically held in open arenas where mud and other debris are abundant, the device must be robust and tolerant to this harsh atmosphere. Still further, the safety device must be able to release the rider quickly and reliably (so that the rider is not inadvertently released), without placing others in harms way. Still further, the device must be compact in order to prevent rubbing against the animal or bumping against the rider.

Still another important problem that must be addressed is the need to have a device that will release the rider quickly, at the precise instant desired, and require minimal modifications to the traditional tack or gear used while riding the animal. The problems associated with the need to provide a release mechanism that can withstand high loads has long been recognized in the shipping industry, where it is often necessary to release a load from the end of a crane or other hoisting device. For example in U.S. Pat. No. 5,178,427 to Jorritsma teaches a self-releasing hook designed for release operation by means of a fluid activated piston. The Jorritsma mechanism is designed to handle high loads, but is rather large and thus limited in its versatility. Thus, this kind of mechanism, while satisfying many of the needs of the shipping industry, is not easily adaptable for the problems associated with disconnecting two sections of strap, such as is needed in the releasing of a cinch strap on a saddle.

Thus in the arts dealing with hoisting or releasing loads, such as moored boats and the like include examples of devices hold heavy loads and release these loads when desired. These examples include U.S. Pat. No. 4,573,725 to Griffiths, which teaches the use of a camshaft which controls the position of a set of balls which allow the release of a crane hook attached to the system. The Griffiths invention uses a battery to drive a motor that controls the position of the camshaft that releases the hook. The ability to use a battery to release the hook is an important advantage which enhances the compactness and manufacturability of the device. The Griffiths mechanism's use of a camshaft within a load carrying lifting pin poses disadvantages in that any distortion due to temperature variations, dirt, or deformation of the load carrying pin can cause the device to jam.

In yet another example, U.S. Pat. No. 4,416,480 to Moody, a remote controlled load hook with pneumatic actuation is taught. The Moody device's pneumatic actuation can severely limit its versatility, since it requires an adequate air source, which can consume significant amounts of space, as well as produce complications with the routing and handling of the air.

Yet another approach is taught in U.S. Pat. Nos. 4,149,746 and 4,073,531 to Androski, which teach the use of an electric motor driven system to disengage the hook. The power requirements of an electric motor that is used to disengage the heavy components of a large capacity hook requires that a relatively large battery be used to actuate the motor. The need to use a large battery will effectively result in a large, bulky device with limited applicability.

In yet another device, which is disclosed in U.S. Pat. No. 3,811,720 to Epstein, a hook that is mounted on a carriage is taught. The movement of the carriage is carried out by at least one fluid actuated cylinder. The position of the carriage determines whether the hook is released or locked. The use of fluid actuated cylinders again results in a high load mechanism which is large and heavy. Moreover, the use of fluid actuated cylinders also requires the inclusion of a fluid delivery system, which prevents the system from being compact and self contained.

U.S. Pat. No. 3,154,337 to Walker is yet another example of known high load, remote controlled, latch systems. The Walker device uses a pair of substantially L-shaped members to engage a T-shaped cable attachment. The L-shaped members are spread apart from one another in order to release the T-shaped member. This system has the clear disadvantage that the L-shaped members will bear the load transmitted by the T-shaped member. This arrangement can require large forces to move L-shaped members due to the fact that the frictional resistance on the L-shaped members will depend directly on the load carried by the device. Thus, the release of a very heavy load may be very difficult due to the large forces required to move the L-shaped members when under a heavy load.

In a remote controlled latch device taught in U.S. Pat. No. 3,134,154 to Smith et al. the use of a solenoid type release mechanism is taught. The solenoid actuated release pulls on a keeper block which fits in a guide block. The movement of the keeper block releases the mechanisms latch, which holds the materials to be supported. The Smith device offers advantages in offering remote controlled actuation, but suffers from the limitation that the load to be carried rests on the keeper block. Since the keeper block is moved by a solenoid type device, it cannot support great loads, since the frictional forces introduced between the keeper block and the guide block are likely to be too great for effective actuation of the keeper block by a solenoid. Thus it is believed that the Smith device is likely jam under high loads.

Still other examples of mechanisms which teach devices that can use low power actuators such as solenoids are frequently found in the arts dealing with automobile door latching mechanisms. Examples of these mechanisms can be found in U.S. Pat. No. 5,494,321 to Ishihara et al, or U.S. Pat. Nos. 5,273,325 to Zimmermann, 5,273,324 to Kobayashi, 4,624,491 to Vincent, and 3,359,767 to Arlauskas et al. However, the door latching mechanisms, while strong and reliable, typically depend on mating surfaces that are always in a known or fixed relationship to one another. Thus these mechanisms do not deal with the problems associated with connecting two flexible sections of strap, such as required when connecting two sections of cinch strap in a saddle or rigging assembly.

Thus the known devices do not satisfy the need for a strong latch mechanism that is compact, that is not prone to jamming, and that is reliable even in harsh conditions such as those found a rodeo arena. There remains a need for a high load capacity latch system which is compact and can withstand repeated jerk and impact loads without accidentally opening. Also, there remains a need for a high load carrying latch mechanism that can be operated with very little energy to effectively control the release of a large load.

Still further, there remains a need for a compact, self contained device that is capable of holding and releasing large loads, and be operable by means of a low power signal. Still further, there remains a need for a compact system that can hold large loads and release these loads by using very little power.

There remains a need for a device that can hold large loads on a flexible support, such that the holding can allow flexing an movement of the flexible support and the accompanying load.

SUMMARY

It has been discovered that the above problems can be solved by providing a remotely actuateable latch system which is mountable on the cinch straps of the saddle or other device used to attach to the body of the animal. The latch system is preferably placed at a position along the cinch that will result in placement of the device under the rib or belly areas of the animal. The latch system includes a housing with a cross member and means for attaching a strap, and the latching mechanism includes the following elements for its operation:

a) A crank shaft with a longitudinal axis, the crank shaft is mounted on the housing in a manner that provides support for the crank shaft while allowing rotation of the crank shaft about the longitudinal axis of the crank shaft.

b) A generally slotted opening that is incorporated into the crankshaft, the opening is incorporated as part of an attachment or as an integral part of the crank shaft. The slotted opening is substantially parallel to the longitudinal axis of the crank shaft. The slotted opening is adapted for receiving a rod that is attached to one of the sections of the cinch strap.

c) Means for allowing rotation of the crank shaft in response to a control signal, such as a remote control signal from a transmitter. The rotation of the crank shaft is between a first position where the generally slotted opening of the crank shaft is obstructed by the cross member of the support housing, so that the rod may be retained within the longitudinal opening of said crank shaft, and a second position where the longitudinal opening on said crank shaft is generally unobstructed by the cross member of the support housing, so that the rod may be removed from the slotted opening of the crank shaft.

According to a highly preferred embodiment of the invention the crank shaft also includes at least one arm which cooperates with a brace that is pivotally mounted on the housing. The brace can be pivoted between two positions. In the first position, the brace engages the arms on the crank shaft, preventing the rotation of the crank shaft and retaining the slotted opening of the crank shaft in a position where the slotted opening of the crank shaft is obstructed by the cross member of the support housing. In the second position, the brace does not engage the crank shaft, allowing the rotation of the crank shaft and allowing the crank shaft to rotate to a position where the slotted opening is unobstructed by the cross member on the housing, allowing the insertion or removal of the rod on the cinch strap.

In a highly preferred embodiment of the invention, the movement of the brace is controlled by a servomotor or a solenoid or the like which is controlled by a remote control signal. The power to actuate the servomotor or the solenoid and the remote control receiver and actuation mechanism and control systems are provided by an electrical power source such as a battery installed in the housing. Similarly, the remote control receiver and control systems for the actuation mechanism are also stored within the housing.

The remote control receiver responds to a signal from a portable remote control transmitter. The housing is designed to be mounted below the rib or belly area of the animal. The location of the latch system on the cinch is important since it was found that radio waves are absorbed by the animal's flesh. Thus the system may not receive the radio waves if the animal is between the receiver and the transmitter. The option of weaving an antenna for the receiver through the cinch was investigated. However this solution was found to be undesirable since the release of the sections of cinch could tear the antenna from the device, resulting in repairs to the unit after each use. Also, attaching the antenna to the rigging was ruled out since it could harm the rider or be damaged during the ride.

It is important to note that the preferred position of the latch system, at approximately mid-span along the length of the cinch, is not merely a design choice, but an important feature of the invention. It has been found that, in addition to the benefits in control signal reception, the attachment of the device to the preferred location is that it prevents the accidental dropping of the system on the ground every time the system is attached to animal. Thus this arrangement not only avoids impact loads to the apparatus from dropping the device on the ground, but also reduces the risk of getting dirt into the latching mechanism.

It should be appreciated that it has been discovered that the latch mechanism should be placed directly underneath the animal's belly or rib area. At this location an antenna can hang down from the unit without interfering with the rider or the horse. Moving the device also made it possible to increase the physical dimensions and still prevent interference with the rider as well as preventing the unnecessary exposure to harmful elements.

It should be apparent that the disclosed invention solves problems with hazards associated with releasing the rider from an animal at a rodeo. Also, it should become apparent that the disclosed system solves problems associated with timed release systems, since these systems may release at such times as to place the rider in greater danger than the danger of being unable to free himself from the animal.

Moreover, it should be understood that the disclosed invention allows the quick release of a latch under a high load without requiring the use of high powered motors or actuation mechanisms. This allows the system to be incorporated in a self contained housing which does not interfere with the rider or animal.

Still further, it should be understood that the disclosed latch system can be used for supporting and releasing large loads supported from a flexible support, such as loads held by aircraft or by a crane. The device's ability to accommodate flexing or movement of the flexible supports allows use of the device to release large loads from a strap hanging from a helicopter, for example.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it is understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
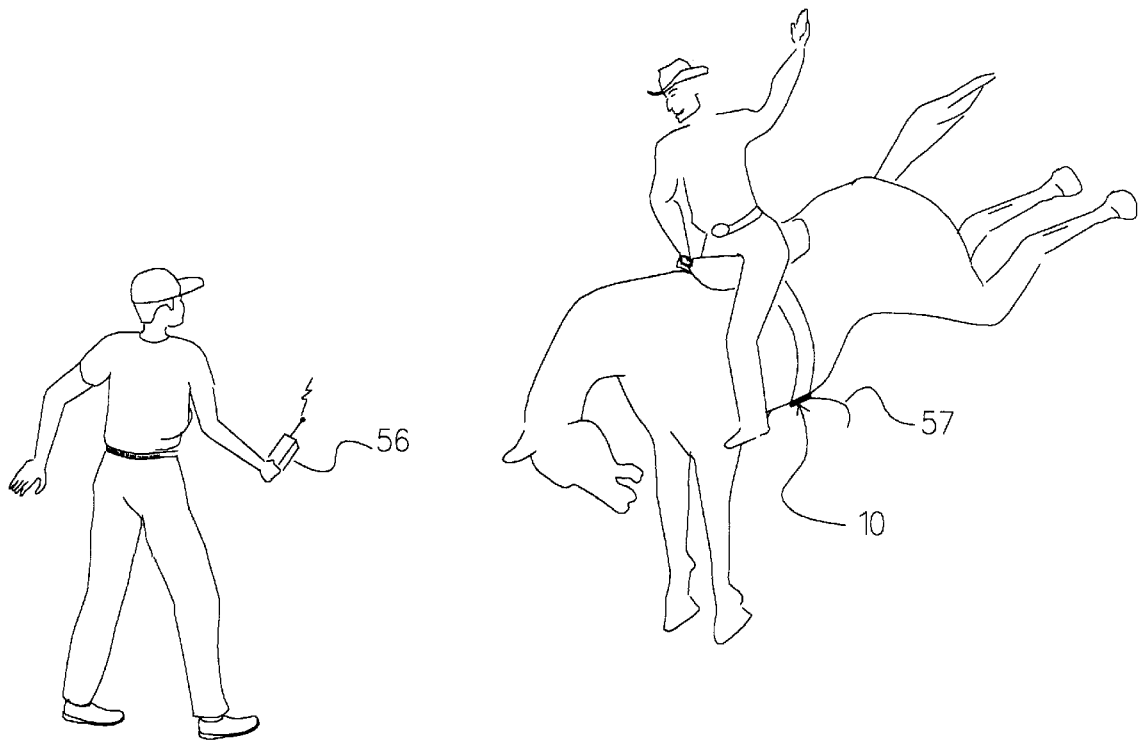
FIG. 1 shows the system in use.
Figure 2:
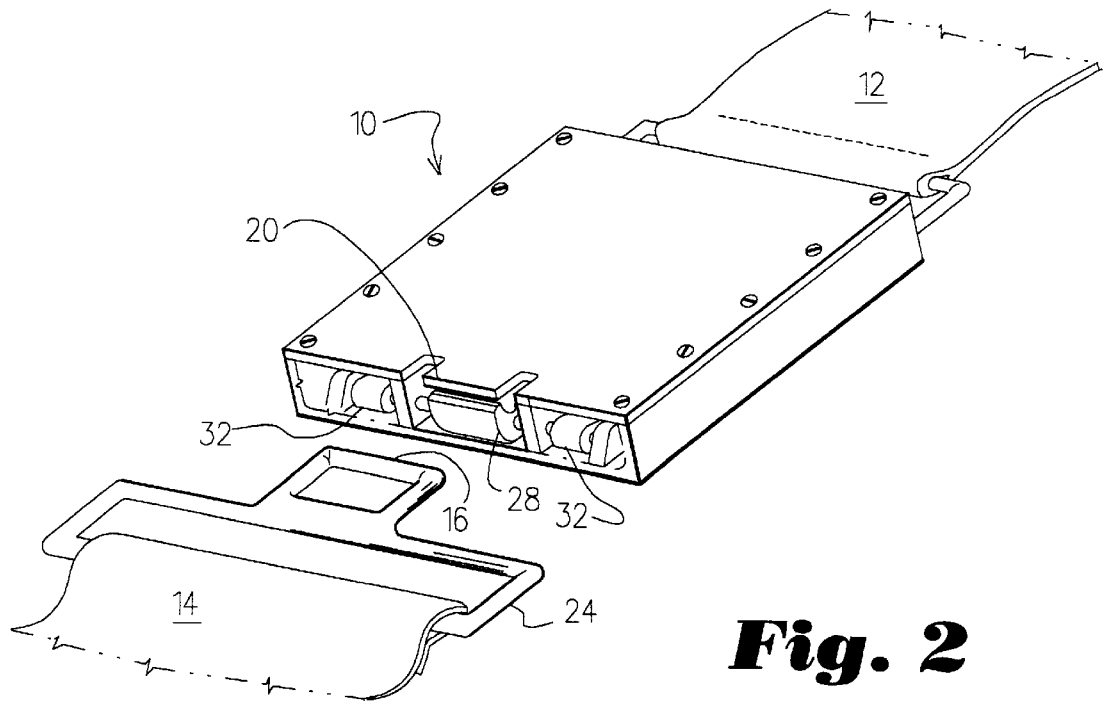
FIG. 2 is a perspective view of the system, showing the housing, crank shaft, and slot for receiving the bar on the cinch strap. The housing has been shown without the front walls of the housing, exposing the arms at the ends of the crank shaft.

As shown in FIG. 1, the preferred embodiment of the system is placed on at approximately mid-span along a cinch to allow quick release of the saddle or other riding tack from the animal. Shown in FIG. 2, is a preferred embodiment of a remote control latch system 10 in accordance with the instant invention. As has been illustrated in FIG. 2, the latch system 10 joins a first strap section 12 to a second strap section 14, the second strap section 14 having a rod 16 adapted for insertion into the latch system 10. The latch system 10 allows the second strap section 14 to be released from the latch system 10 in response to a control signal. The control signal may be produced as a response to a remote control signal or a response to another triggering circuit or mechanism. It is contemplated that the function of the straps may be accomplished by a cable, rope, chain or other flexible support means.

The latch system 10 includes a support housing 18. The support housing 18 serves to contain and protect the inner components of the latch system 10 and serves to transfer the load from the first strap section 12 and on to the second strap section 14. In a preferred embodiment of the invention, one of the strap sections is permanently attached to the latch system 10 by an attachment means 22 which serves for attaching the strap section to the support housing 18 of the latch system 10.

The second strap section 14 includes a fitting 24 that supports the rod 16 that is used to connect the section of strap to the latch system. The rod 16 serves as a releasable means nests within a slotted opening 26, which is a part of a crank shaft 28 which is supported within the housing 18.

Figure 3:
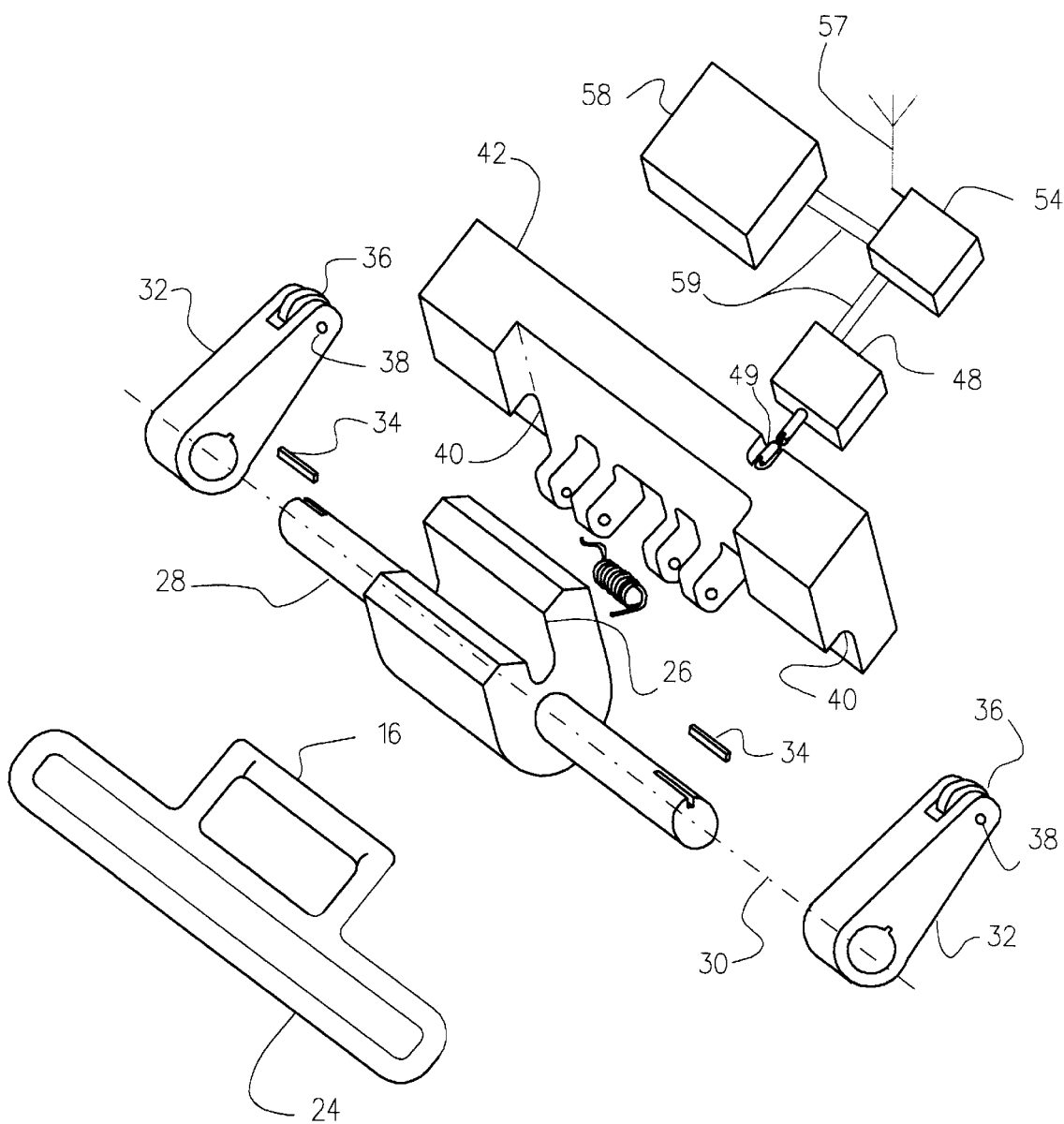
FIG. 3 is an exploded view of the internal components of the system. The housing is not shown.
Figure 4:
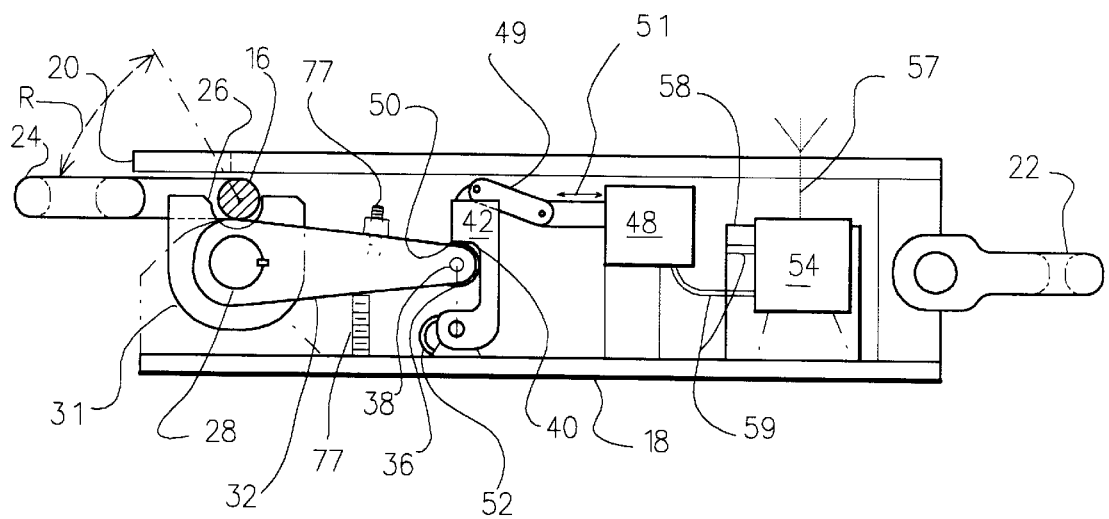
FIG. 4 is a side sectional view of the system in the locked position, with the slot on the crankshaft being obstructed by the cross member on the housing.
Figure 5:
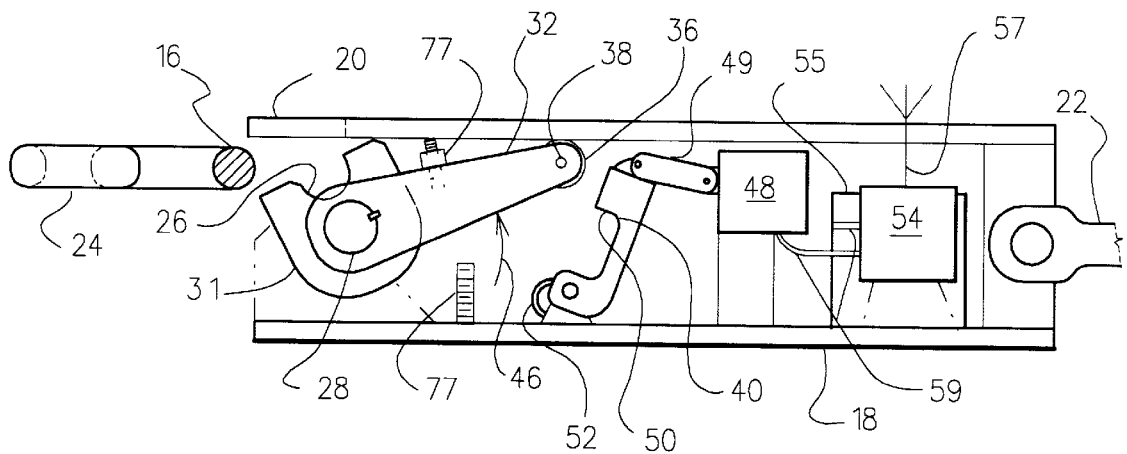
FIG. 5 is a side sectional view showing the bar on the cinch being released while the brace is in a position that allows the crank shaft to rotate to a position where the slot on the crankshaft in unobstructed.

Turning now to FIGS. 3–5, it can be seen that the crank shaft 28 has a longitudinal axis 30, and that the crank shaft 28 is mounted and supported by the housing 18. The crank shaft 28 is preferably supported by means of bearings, such as drawn cup needle bearings which have not been shown on the drawings. The use of the bearings at the mounting points on the housing reduces the amount of power needed to rotate the crank shaft.

As has been illustrated in FIG. 3, the generally slotted opening 26 that is part of the crank shaft 28 is substantially parallel to the longitudinal axis 30 of the crank. The slotted opening 26 is part of a catch section 31 which may be described as an enlarged section of the crank shaft 28, and having a generally U-shaped cross section. It is contemplated that the catch section 31 may be incorporated onto the crank shaft 28 as an integral part of the crank shaft 28 or as part of a press fit or otherwise fastened separate element which is attached to the crank shaft 28 at approximately mid-span along the shaft.

As shown on FIG. 3, near the ends of the crank shaft 28 are attached lever arms 32. One end of the arms 32 is preferably slid over the end of the crank shaft 28 and secured in place by keys 34. The keys 34 are sized to shear off in the event of excessive torsional loading on the catch section 31. The arms 32 are used as levers which control the rotation of the crank shaft 28. At another end of each of the shafts at least one bearing 36 is attached on a pin 38. The bearing 36 is preferably of a suitable roller or needle type bearing, although it is preferred that needle bearings be used due to their high load carrying characteristics.

The bearings 36 at the ends of the arms 32 are configured to fit within a recess 40 in a brace 42. As shown on FIGS. 4 and 5, the brace 42 is pivotally mounted on the support housing 18. Thus, by accepting the arms 32 within the recesses 40 of the brace 42, the brace 42 serves as a means for allowing the selective rotation of the crank shaft 28. Therefore, when an end of the arm 32 is in the position shown in FIG. 4, the crank shaft 28 is prevented from turning in the release direction, which has been indicated by arrow 46 shown on FIG. 5.

Since the brace 42 is pivotally mounted on the housing 18, it may be moved from the position shown on FIG. 4, which will be referred to herein as the first position, to the position shown on FIG. 5, which will be referred to herein as the second position. When the brace 42 is in the first position the arms 32 are retained by the brace 42, thereby preventing rotation of the crank shaft 28. It is important to note that while the brace 42 is in the first position it retains the crank shaft 28 in the position shown in FIG. 4, which allows retention of the rod 16 within the slotted opening 26.

Figure 6A:
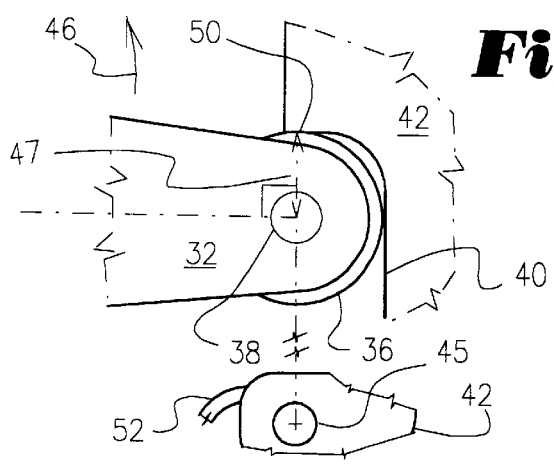
FIG. 6A is a detail view showing the reaction force (indicated by an arrow) on the arm. The relationship between the brace support and pivot point and alignment with the reaction point of where the arm contacts the brace.

Movement of the brace 42 to the second position, shown on FIG. 5, frees the arms from the brace 42. It is important to note that the recess 40 in the brace 42 includes a substantially flat surface 50. As has been shown in FIG. 6, when the brace 42 is in the first position, the bearings 36 on the arm 32 will exert a force that will tend to pull the arm 32 in the direction of arrow 47, shown on FIG. 6A. The force exerted along arrow 47 is reacted by the brace support 45. A line between the brace support 45 and the contact point of the bearing 36 on the substantially flat surface 50 should be at a right angle to a line drawn between the center of the pin 38 and the longitudinal axis 30 of the crank shaft 28. This will allow the brace to rest in a position where forces on the crank shaft 28, and hence the arm 32, will be reacted through the brace support 45, and will not induce a moment on the arm 42. By eliminating the possibility of a moment on the arm 42 one eliminates the need for a large spring 52 to keep the brace in the locking position. Thus, by reducing the size of the spring 52 one can rotate the arm 42 with a very small force. This force is further reduced by connecting the solenoid, servo, or other means for moving the arm at the largest possible distance from pivot point of the brace, which is the brace support 45. By enhancing the bias of the brace 42 in the direction of arrow 47 the device ensures that the arm 32 is not free to rotate in the direction of arrow 46, ensuring that the rod 16 cannot be released from the slotted opening 26.

Figure 6B:
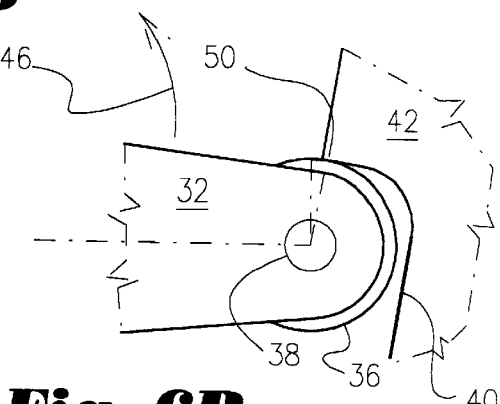
FIG. 6B is a detail view showing that the reaction force (indicated by an arrow) on the brace from the arm tends to push the brace away after the brace is pulled by the servo. In other words, the view illustrates that once the brace is pulled by the servo, the reaction force from the arm will cooperate with the force imposed by the servo and push the brace away from the arm.

Referring now to FIG. 6B, it can be seen that as the brace 42 is rotated away from the crank shaft 28, the point and angle where the bearing 36 reacts on the surface 50 will change. This will result in the exertions of a force that when reacted by the brace 42 will have a tendency to rotate the brace away from the arm 32, speeding up and assisting the pull from the servo 48.

Therefore, to release the rod 16 from the slotted opening 26, the crank shaft 28 and, hence, the slotted opening 26 should be rotated in the direction of arrow 46, to the position shown in FIG. 5. However, in order to allow the crank shaft 28 to rotate, the brace 42 must first be moved to the second position, which has been illustrated on FIG. 5. Movement of the brace 42 from the position shown on FIG. 4 to the position shown in FIG. 5 is accomplished by a means for moving the brace. In a preferred embodiment this is accomplished by a servomotor 48; although it is contemplated that this movement of the brace 42 may be accomplished by a solenoid, electric motor or other equivalent devices which can move the brace 42 may also be used.

A servomotor 48 was selected as the means for moving the brace 42 due to its low power consumption. The selection of a low power means for moving the brace was very important since some of the important features of the device are that it be self contained, unobtrusive and capable of being remotely controlled. Thus the use of a means which uses large amounts of power would have necessitated the use of a large battery. This would clearly lead to a heavy, obtrusive device. Also, the low power consumption was desired in order to provide a device that could be actuated several times without having to recharge or change the battery.

As has been illustrated in FIGS. 4 and 5, the cross member 20 of the housing 18 cooperates with the crank shaft 28 to retain the rod 16 within the slotted opening 26. Thus the cross member 20 of the housing 18 completes the system. When the system components are positioned as shown on FIG. 4 the cross member 20 of the housing blocks off a substantial portion of the slotted opening 26, so that the rod 16 is held within the slotted opening 26.

When the arm 32 is released from the brace 42 the crank shaft 28 is left free to rotate from the position shown on FIG. 4 to the position shown on FIG. 5. The removal of the rod 16 from the slotted opening 26 is accomplished by simply pulling the rod 16 away from the housing 18 when the crank shaft 28 has been left free to rotate relative to the brace 42. Thus, when the rod is pulled from the housing 18 it will cause the crank shaft 28 to rotate to a position where the rod 16 may be removed from the slotted opening 26 of the crank shaft 28.

From the above discussion it can be appreciated that the ability to rotate the crank shaft 28 is determined by the position of the brace 42. The position of the brace 42 is controlled by incorporating a spring 52 which restores the position of the brace 42, to keep the brace in the first position, shown on FIG. 4. Thus the system may be latched without the use of the electrical energy stored in the battery 58. The servo motor 48 serves to oppose the spring 52, as well as frictional resistance, and move the brace 42 to the second position. Since the spring bias restores the position of the brace 42, it is advantageous to include the smallest (smallest spring rate) possible in order to reduce the power requirements on the servo or other means used to pull on the brace 42. As explained above, the system is optimized by ensuring that reaction forces from the arm 32 are transmitted to the housing 18 without inducing a moment on the brace 42. As explained above, this is accomplished by ensuring that the arm 32 can rest at a right angle to a line drawn from the point of contact between the bearing 36 and the surface 50 and the center of the brace support 45. To ensure reliable, consistent results set screws 77 have been incorporate to limit the travel of the arm 32. Also, it is contemplated that a small groove could be incorporated into the surface 50 to register the bearing 36. However, this groove would increase the amount of power needed to move the brace 42.

The activation of the servo motor 48 is controlled by a receiver 54 which responds to signals from a transmitter 56, shown on FIG. 1. The receiver 54 is powered by a battery 58, which also supplies the power to the actuator means for moving the brace 42. Thus the receiver 54 is shown with an antenna 57 and is used to recognize a signal from the transmitter and controls the power being delivered to the actuator means from the battery 58.

Figure 7:
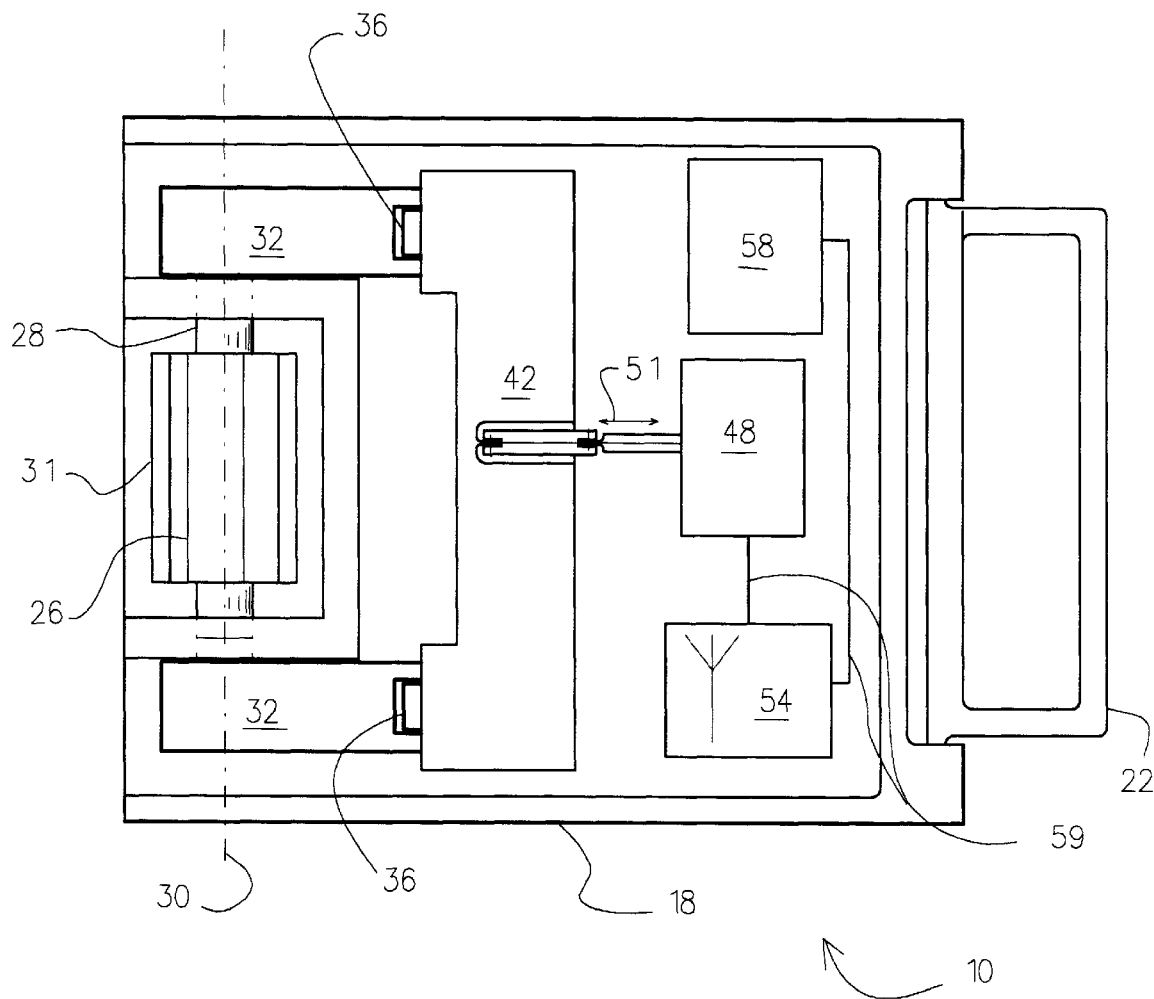
FIG. 7 is a plan view showing a general arrangement of the components of the system. The section of the housing which contains the cross member of the housing which cooperates with the slot on the crank shaft is not shown.

Turning now to FIG. 7, where a plan view of an embodiment of the main components of the latch system 10. It is important to note that all of the components are protected by the housing 18, with the slotted opening 26 being exposed in order to allow insertion of the rod 16.

It is important to note that the described arrangement produces important new, useful results. One of these results is that, in addition to having a low profile and requiring low power for operation, the latch system 10 allows significant movement of the first strap section 12 relative to the second strap section 14. Referring to FIG. 4, this ability allow rotation of one strap relative to the other has been indicated with reference character R, and illustrates that the instant invention can easily accommodate rotations of the fitting 24 of sixty degrees relative to the housing 18. This ability to rotate, coupled with the ability to attach to flexible straps, results in a highly flexible system which is unobtrusive and does not hinder the flexibility of straps that are joined with the system. This is an important result since this flexibility allows use of the latch system to attach to rounded bodies, such as an animal's body, or to hoist and remotely release rounded artifacts.

Also, the invention's ability to hold and release large loads with an actuation system that requires very little power is accomplished by attaching arms 32 to the crank shaft 28 in order to reduce, or lever, the amount of force required to control the movement of the crank shaft 28. Also, the use of bearings at the ends of the arms 32, combined with the brace 42 which includes a flat surface 50, allows the reliable release of the system, hence the release of large loads, with very little power. Clearly, the ease of movement of the brace 42 as well as the rotation of the crank shaft 28 will be enhanced by the inclusion of bearings at axes of rotation.

When using the latch system 10 as part of a cinch on a saddle it is important to be able to position the latching mechanism at the belly or chest area of the animal, where a great deal of curvature is encountered. As explained above this position allows improved reception of the remote control signal from the transmitter 56. However to position the latch system about the belly or below the chest and rib area of the animal requires that the cinch be allowed to flex or swing up to sixty degrees relative to the latch system 10, and effectively release the second strap 14 throughout the entire range of motion. The flexible latch system 10 of disclosed invention has been found to be able to provide these new and useful results. In a preferred embodiment of the invention the brace 42 is pulled by the servo motor 48 by means of a linkage 49 in the direction 51, and rotates approximately 45 degrees about the brace support 45 in response to a force from the servo motor 48 or means for moving the brace. The rotation of the brace releases the arms 32 and allows the crankshaft to rotate 25 approximately 25 degrees, allowing removal, or insertion, of the rod 16.

EXAMPLE

A remote control latch system in accordance with the principles described herein was built and tested. The example device included a Hitech Ranger 2E servo motor as the servo motor 48, this servo is manufactured by the Hitech Corporation of Santee, Calif.

The battery power source important to success of the entire system is the battery selection. This is due to the fact that there is limited volume in the housing 18 for a battery pack. Therefore, it was advantageous to select a battery having a relatively small size, and that is capable of performing the necessary duties. The electrical system made in accordance to this example was found draws 12 milliamps during standby, and a maximum of 0.5 amps at maximum load. To meet these needs the PX28L model lithium battery manufactured by the Duracell Corporation of Bethel, Conn., was chosen since it has a rated life of 180 mAh with the capability to deliver 0.5 amps for short periods of time. A lithium battery was selected since it can supply at least 90% of its rated voltage for 70% of the battery's rated capacity. This implies that the battery has a useful life of approximately 126 mAh. If a single usage is modeled as consisting of a standby draw of 12 mA for 20 minutes and a maximum use amperage of 0.5 A for 0.5 seconds, the battery will adequately operate the release mechanism 31 times

MATERIAL SELECTION

Because the internal parts, such as the brace 42 and the crank shaft 28 needed to be a relatively high hardness, A2 tool steel was chosen for this example. A2 was selected over other tool steels because it had the highest resistance to cracking, which is the property that will limit the strength of the hardened material. It also distorts the least of any tool steel, which made it very desirable given the close tolerances of the components (±0.0003 in. for bearing support surfaces).

The keys 34 in this example had a cross sectional surface of approximately $\frac{3}{32}$ inches by $\frac{3}{32}$ inches. This allowed the keys 34 to be made the limiting component of the system, meaning that they are designed to fail prior to any machined components.

Needle bearings that were protected by seals were used at the locations where the crank shaft 28 is supported by the housing 18, and standard needle bearings were used where the brace 42 mounts to the housing 18. However, it is contemplated that sealed bearings could be used to support the crank shaft 28 on the housing 18. Sealing the bearings ensures reliable operation in harsh environments. The system was tested and found to be flexible and capable of releasing loads in the range of 1000 pounds in a reliable manner.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A latch system for joining a first strap section to a second strap section, the second strap section having a releasable means adapted for insertion into the latch system, and for releasing the second strap section in response to a control signal, the latch system comprising:

a support housing having a cross member and means for attaching the housing to the first strap;

a crank shaft, the crank shaft having a longitudinal axis and being rotatably supported within the support housing and having an opening that is substantially parallel to the longitudinal axis and adapted for receiving the releasable means; and means for allowing rotation of said crank shaft in response to a control signal, the rotation being between a first position where the opening of the crank shaft is obstructed by the cross member of the support housing, said means for allowing rotation of said crank shaft in response to a control signal comprising:

at least one lever arm attached to said crank shaft;

a brace means for engaging said lever arm, said brace means being pivotally mounted to said housing and connected to a means for moving said brace means between a first position where said brace means engages said lever arm, so that rotation of said crank shaft is prevented, and a second position where said lever arm is free to move relative to said brace means, so that the releasable means may retained within the opening of said crank shaft when said brace means is in said first position and said crank shaft is in said first position, and so that the releasable means may be removed from the opening of said crank shaft when said brace means is in said second position, allowing said crank shaft to move to said second position.

2. A latch system according to claim 1, wherein said means for moving said brace means in response to a control signal comprises an electrical actuator means electrically connected to a receiver means for receiving and responding to a remote control signal.

3. A latch system according to claim 2, wherein said electrical actuator means is powered by a battery within said housing.

4. A latch system according to claim 2, wherein said electrical actuator means is electrically connected to a power source.

5. A remote controlled latch system for joining a first section of a strap to a second section of a strap on a rigging for mounting an animal, the latch system comprising:

a support housing having a cross member and means for attaching to a first section of strap;

a rotatable crank shaft having a longitudinal axis and a catch, the catch having an opening that is generally parallel to the axis of the crank shaft;

at least one lever arm attached to said crank shaft;

a brace means for engaging said lever arm, said brace means being pivotally mounted to said housing and connected to a means for moving said brace means between a first position where said brace means engages said lever arm so that rotation of said crank shaft is prevented and a second position where said lever arm is free to move relative to said brace means;

a releasable means adapted for insertion into the opening of said catch and having means for attaching a second section of strap;

means for allowing rotation of said brace means in response to a remote control signal, the rotation being between a first position where the position of said crank shaft and the opening of the catch is obstructed by the cross member of the support housing is maintained, and a second position where the motion of the crank shaft and opening of the catch is moveable so that the motion of the releasable means in relation to the housing is generally unobstructed by the cross member of the support housing, so that said releasable means may be removed from the opening of the catch.

6. A latch system according to claim 5, wherein said means for moving said brace means is an electrical actuator means that is powered by a battery within said housing.

7. A latch system according to claim 6, wherein said actuator means is an electrical solenoid.

8. A latch system according to claim 6, wherein said actuator means is a servo motor.

9. A latch system according to claim 8, and further comprising:

a power source;

a remote control receiver having means for controlling power from the power source to the solenoid, so that power to actuate the solenoid may be controlled in response to a signal delivered to the remote control receiver.

10. A latch system according to claim 9, wherein said cross member comprises a plate, so that the plate may cover said housing and retain said releasable means within the opening of said crank shaft.

11. A remote controlled, releasable latch system for joining a first section of a strap to a second section of a strap on a rigging for mounting an animal, the latch system comprising:

a support housing having a cross member and means for attaching to a first section of strap;

a crank shaft, the crank shaft being rotatably supported within said support housing and having an opening, and further comprising at least one lever arm having a first end and a second end, the first end of the lever arm being rigidly connected to said crank shaft, so that rotation of said crank shaft may be controlled by movement of the second end of the lever arm, and at least one pawl means for securing the position of the second end of the lever arm;

releasable means adapted for insertion into the opening of said crank shaft and having means for attaching a second section of strap;

a solenoid actuateable in response to a remote control signal and connected to the pawl means, so that the pawl means may be moved by said solenoid in response to a remote control signal, and so that motion of the pawl means releases the second end of the lever arm and thereby allowing motion of the crank shaft between a first position where the opening of the crank shaft is obstructed by the cross member of the support housing and a second position where the opening of said crank shaft is generally unobstructed by the cross member of the support housing, so that said releasable means may be removed from the opening of said crank shaft.

12. A remote controlled, releasable latch system for joining a first section of a strap to a second section of a strap on a rigging for mounting an animal, according to claim 11, wherein said cross member comprises a plate, so that the plate may cover said housing and retain said releasable means within the opening of said crank shaft.

13. A remote controlled, releasable latch system for joining a first section of a strap to a second section of a strap on a rigging for mounting an animal, according to claim 12, and further comprising:

a power source;

a remote control receiver having means for controlling power from the power source to the solenoid, so that power to actuate the solenoid may be controlled in response to a signal delivered to the remote control receiver.

* * * * *